US007738850B2

(12) United States Patent
Byun

(10) Patent No.: US 7,738,850 B2
(45) Date of Patent: Jun. 15, 2010

(54) BROADCASTING SIGNAL PROCESSING APPARATUS AND CONTROL METHOD THEREOF

(75) Inventor: Ho-jin Byun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 679 days.

(21) Appl. No.: 11/698,816

(22) Filed: Jan. 29, 2007

(65) Prior Publication Data

US 2007/0207753 A1    Sep. 6, 2007

(30) Foreign Application Priority Data

Mar. 6, 2006    (KR)    ...................... 10-2006-0020940

(51) Int. Cl.
*H04B 1/18*    (2006.01)
*H04Q 7/20*    (2006.01)

(52) U.S. Cl. .................... 455/280; 455/193.1; 333/129; 343/861

(58) Field of Classification Search ................. 455/107, 455/280, 193.1; 333/32, 129, 132; 343/860, 343/861
See application file for complete search history.

(56) References Cited

U.S. PATENT DOCUMENTS 2,861,267 A * 11/1958 Arrasmith ................... 343/822
4,799,066 A *  1/1989 Deacon ....................... 343/861
6,466,774 B1 * 10/2002 Okabe et al. .............. 455/150.1
2005/0119026 A1 *  6/2005 Harano ..................... 455/556.1

FOREIGN PATENT DOCUMENTS

| JP | 2002-290850 A | 10/2002 |
| KR | 10-2004-0062508 A | 7/2004 |
| KR | 10-2005-0028115 A | 3/2005 |
| KR | 10-2005-0073248 A | 7/2005 |

* cited by examiner

*Primary Examiner*—Lee Nguyen
(74) *Attorney, Agent, or Firm*—Sughrue Mion, PLLC

(57) ABSTRACT

A broadcasting signal processing apparatus and a control method thereof are provided. The broadcasting signal processing apparatus includes a wireless antenna; a radio frequency (RF) module which tunes a broadcasting signal; a variable part which adjusts an impedance to match an impedance of the wireless antenna with an impedance of the RF module; and a controlling part which pre-stores impedance variable values for impedance matching and which controls the variable part to adjust the impedance based on one of the pre-stored impedance variable values corresponding to a broadcasting frequency of a selected broadcasting channel. The method includes tuning to a broadcasting frequency; determining whether an impedance used to match a wireless antenna with a radio frequency (RF) module is different from an impedance variable value; and if the impedance is different, adjusting the impedance.

17 Claims, 8 Drawing Sheets

BROADCASTING SIGNAL PROCESSING APPARATUS AND CONTROL METHOD THEREOF

CROSS-REFERENCE TO RELATED APPLICATIONS

This application claims priority from Korean Patent Application No. 10-2006-0020940, filed on Mar. 6, 2006, in the Korean Intellectual Property Office, the disclosure of which is incorporated herein by reference.

BACKGROUND OF THE INVENTION

1. Field of the Invention

Apparatuses and methods consistent with the present invention relate to a broadcasting signal processing apparatus and a control method thereof, and more particularly, to a broadcasting signal processing apparatus, which is capable of reducing a difference in receiving sensitivity between channels which occurs in changing a broadcasting channel when a broadcasting signal is received through a wireless antenna, and a control method thereof.

2. Description of the Related Art

In the related art, a broadcasting signal processing apparatus for allowing a user to select a broadcasting channel and for receiving and/or processing a broadcasting signal corresponding to the selected broadcasting channel includes an antenna for receiving the broadcasting signal, an RF module for selecting a broadcasting frequency corresponding to the selected broadcasting channels from the received broadcasting signal, and a broadcasting signal processor for processing the broadcasting frequency selected in the RF module, that is, a broadcasting signal of the selected broadcasting channel.

In recent years, such a broadcasting signal processing apparatus has a tendency to be provided to receive and/or process broadcasting signals while the broadcasting signal processing apparatus is moving, without being stationary, in order to develop broadcasting systems and meet many desires of users. According to this tendency, broadcasting signal processing apparatuses are equipped with wireless antennas, not wired antennas, to allow the broadcasting signal to be received and/or processed without any restriction on the movement of the broadcasting signal processing apparatus.

A Digital Multimedia Broadcasting (DMB) may be an example of representative broadcastings received and/or processed by the broadcasting signal processing apparatuses equipped with the wireless antennas. At present, the DMB offers seven broadcasting channels from CH 7 to CH 13 using different broadcasting frequency bands. In a related art broadcasting signal processing apparatus equipped with a wireless antenna, the length of the wireless antenna is determined to meet a broadcasting frequency band corresponding to a specified broadcasting channel. For example, the related art broadcasting signal processing apparatus is equipped with a wireless antenna having a length determined to meet a broadcasting frequency band of about 202 MHz to about 209 MHz corresponding to a broadcasting channel CH12.

More specifically, when the length of the wireless antenna in the broadcasting signal processing apparatus is determined to meet the broadcasting channel CH12, the length of the wireless antenna is equal to a half wavelength, i.e., a wavelength ($\gamma$)/2, and the wavelength ($\gamma$)=propagation velocity (v)/frequency (f). Accordingly, the wavelength ($\gamma$) of the broadcasting channel CH12 is about 148 cm (propagation velocity (v=300,000 km/s)/frequency (f=about 202 MHz) and the length of the wireless antenna is determined as about 148 cm/2, i.e., about 74 cm.

However, in addition to the broadcasting channel CH12, the broadcasting signal processing apparatus equipped with the wireless antenna may receive many other broadcasting channels, for example, CH7, CH8, CH9, CH10, CH11 and CH13, using broadcasting frequencies different from the broadcasting frequency of CH12. However, if the related art broadcasting signal processing apparatus equipped with the wireless antenna whose length is determined to meet one broadcasting channel (e.g., CH12) receives a broadcasting signal of a different broadcasting channel (e.g., CH8), since the length of the wireless antenna is determined to meet the broadcasting channel CH12, capability to receive the broadcasting signal of the different broadcasting channel is lowered, which results in a difference in receiving capabilities between broadcasting channels.

Hereinafter, the receiving capability difference between broadcasting channels will be described in brief with reference to FIG. 5. FIG. 5 shows a voltage standing wave ratio (VSWR) a' in selecting the broadcasting channel CH12 and a VSWR b' in selecting the broadcasting channel CH8 in the related art broadcasting signal processing apparatus in which the length of the wireless antenna is determined to meet the broadcasting channel CH12. A lower VSWR of an antenna means a higher signal receiving capability. As can be seen from FIG. 5, since the length of the wireless antenna is determined to meet the broadcasting channel CH12, when the wireless antenna receives a broadcasting signal having a broadcasting frequency band (f6~f7) corresponding to the broadcasting channel CH12, the VSWR a' of the wireless antenna has a very small value R1. On the other hand, when the wireless antenna receives a broadcasting signal having a different broadcasting frequency band (f2~f3) corresponding to the broadcasting channel CH8, since the length of the wireless antenna meets the broadcasting channel CH12, not the broadcasting channel CH8, and accordingly, there is no impedance matching between the wireless antenna and the RF module, the VSWR b' of the antenna has a relatively large value R2.

As mentioned above with reference to FIG. 5, the length of the wireless antenna in the related art broadcasting signal processing apparatus is determined to meet one broadcasting channel (e.g., CH12). Therefore, when broadcasting channels other than the broadcasting channel which has been used to determine the length of the antenna from the broadcasting signal processing apparatus (e.g., CH12) are selected for reproduction of broadcasting, there may arise a problem of irregularity and instability of broadcasting receiving conditions in the absence of impedance matching.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

It is an aspect of the present invention to provide a broadcasting signal processing apparatus, which is capable of reducing a difference in receiving sensitivity between channels which occurs in changing a broadcasting channel when a broadcasting signal is received through a wireless antenna, and a control method thereof.

The foregoing and other aspects of the present invention can be achieved by providing a broadcasting signal processing apparatus comprising a wireless antenna which receives broadcasting signals; a radio frequency (RF) module which tunes the broadcasting signal received via the wireless antenna; a variable part which adjusts an impedance to match an impedance of the wireless antenna with an impedance of the RF module, the variable part being coupled to the wireless antenna and the RF module; and a controlling part which pre-stores impedance variable values for impedance matching between the wireless antenna and the RF module for broadcasting frequencies corresponding to respective broadcasting channels, and controls the variable part to adjust the impedance based on one of the pre-stored impedance variable values corresponding to a broadcasting frequency of a selected broadcasting channel.

According to an aspect of the invention, the broadcasting signal processing apparatus may further comprise a user input part which selects a broadcasting channel, wherein the controlling part further comprises a microcomputer which pre-stores the impedance variable values for the broadcasting frequencies corresponding to the broadcasting channels and outputs an impedance variable value, among the pre-stored impedance variable values; corresponding to a broadcasting frequency of a broadcasting channel selected through the user input part and an impedance controller which controls the variable part to adjust the impedance to match the impedance of the wireless antenna with the impedance of the RF module based on the impedance variable value output from the microcomputer.

According to an aspect of the invention, the variable part may comprise an impedance matching circuit including at least one variable inductor.

According to an aspect of the invention, the impedance controller may vary an inductance of the at least one variable inductor included in the impedance matching circuit to adjust the impedance to match the impedance of the wireless antenna with the impedance of the RF module based on the impedance variable value output from the microcomputer.

According to an aspect of the invention, the variable part may comprise an impedance matching circuit including at least one variable capacitor.

According to an aspect of the invention, the impedance controller may vary a capacitance of the at least one variable capacitor included in the impedance matching circuit to adjust the impedance to match the impedance of the wireless antenna with the impedance of the RF module based on the impedance variable value output from the microcomputer.

According to an aspect of the invention, the variable part may comprise an impedance matching circuit including at least one variable capacitance diode.

According to an aspect of the invention, the impedance controller may vary a capacitance of the at least one variable capacitance diode included in the impedance matching circuit to adjust the impedance to match the impedance of the wireless antenna with the impedance of the RF module based on the impedance variable value output from the microcomputer.

According to an aspect of the invention, the variable part may comprise an impedance matching circuit including at least two of a variable inductor, a variable capacitor and a variable capacitance diode.

According to an aspect of the invention, the impedance controller may vary each of the at least two of the inductance of the variable inductor, the capacitance of the variable capacitor, and the capacitance of the variable capacitance diode to adjust the impedance to match the impedance of the wireless antenna with the impedance of the RF module based on the impedance variable value output from the microcomputer.

According to an aspect of the invention, the variable part may comprise a length adjusting motor which adjusts a length of the wireless antenna.

According to an aspect of the invention, the impedance controller controls the length adjusting motor to adjust the length of the wireless antenna to match the impedance of the wireless antenna with the impedance of the RF module based on the impedance variable value output from the microcomputer.

According to an aspect of the invention, the broadcasting signal processing apparatus may further comprise a broadcasting output part; and a broadcasting signal processor which processes a broadcasting signal tuned in the RF module and outputs the tuned broadcasting signal to the broadcasting output part.

According to an aspect of the invention, the broadcasting output part may comprise at least one of a display which displays a broadcasting picture according to the tuned broadcasting signal and a sound output part which outputs a broadcasting sound according to the tuned broadcasting signal.

According to another aspect of the present invention, there is provided a control method comprising tuning to a broadcasting frequency of a broadcasting channel; determining whether an impedance used to match an impedance of a wireless antenna with an impedance of the RF module is different from an impedance variable value for the tuned broadcasting frequency of the selected broadcasting channel; and if the impedance is different from the impedance variable value, adjusting the impedance based on the impedance variable value for the tuned broadcasting frequency of the selected broadcasting channel.

According to an aspect of the invention, the control method may further comprise selecting a broadcast channel.

According to an aspect of the invention, the adjusting the impedance may comprise adjusting the impedance to the impedance variable value for the tuned broadcasting frequency of the selected broadcasting channel.

According to an aspect of the invention, the adjusting the impedance to the impedance variable value may comprise varying at least one of an inductance of a variable inductor, a capacitance of a variable capacitor, and a capacitance of a variable capacitance diode, which are coupled to the wireless antenna and the RF module, to adjust the impedance to the impedance variable value for the tuned broadcasting frequency of the selected broadcasting channel.

According to an aspect of the invention, the adjusting the impedance to the impedance variable value may comprise controlling a length adjusting motor to adjust a length of the wireless antenna to adjust the impedance between the wireless antenna and the RF module to the impedance variable value for the tuned broadcasting frequency of the selected broadcasting channel.

BRIEF DESCRIPTION OF THE DRAWINGS

The above and other aspects and advantages of the present invention will become apparent and more readily appreciated from the following description of certain exemplary embodiments, taken in conjunction with the accompanying drawings of which.

DETAILED DESCRIPTION OF EXEMPLARY EMBODIMENTS OF THE INVENTION

Reference will now be made in detail to exemplary embodiments of the present invention, examples of which are illustrated in the accompanying drawings.

Figure 1:
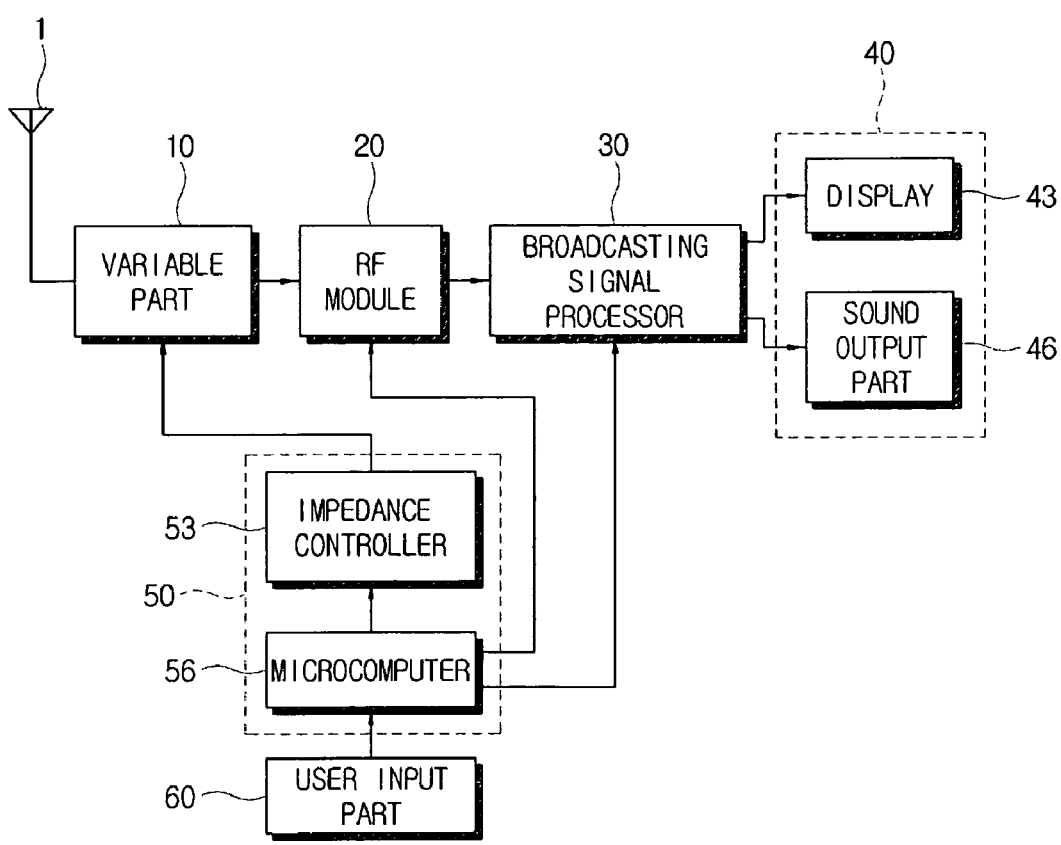
FIG. 1 is a control block diagram of a broadcasting signal processing apparatus according to an exemplary embodiment of the present invention.

As shown in FIG. 1, a broadcasting signal processing apparatus according to an exemplary embodiment of the present invention includes an antenna 1 for receiving broadcasting signals, a variable part 10, a radio frequency (RF) module 20, a broadcasting signal processor 30, a broadcasting output part 40, a controlling part 50, and a user input part 60.

The antenna 1 as a functional part for receiving broadcasting signals is provided as a wireless antenna. The wireless antenna 1 has a length to meet a broadcasting frequency corresponding to one (for example, CH12) of a plurality of broadcasting channels provided from broadcasting stations (not shown) that send broadcasting signals.

In FIGS. 1 and 2A to 2D, the wireless antenna 1 is a Digital Multimedia Broadcasting (DMB) antenna, and the length of the wireless antenna 1 is determined to meet the DMB broadcasting channel CH12. However, this is only an example. Other types of antennas and formats may also be used with the present inventive concept. More specifically, in the case of CH12, the length of the wireless antenna 1 is equal to a half wavelength, i.e., wavelength ($\gamma$)/2, and the wavelength ($\gamma$)=propagation velocity (v)/frequency (f). Accordingly, the wavelength ($\gamma$) of the DMB broadcasting channel CH12 is about 148 cm (propagation velocity (v=300,000 km/s)/frequency of the DMB broadcasting channel CH12 (f=about 202 MHz) and the length of the wireless antenna 1 is determined as about 148 cm/2, i.e., about 74 cm.

A DMB antenna is classified into two kinds of antennas, one being an active-type antenna which uses a separate amplification circuit for amplifying received broadcasting signals and the other being a passive-type antenna which uses no separate amplification circuit. Although a passive-type wireless antenna is shown in FIG. 1, the wireless antenna 1 may also be the active-type antenna and an amplification circuit may be included between the wireless antenna 1 and the variable part 10. In other words, the broadcasting signal processing apparatus according to an exemplary embodiment of the present invention is applicable irrespective of whether the wireless antenna 1 is of an active type or a passive type.

The RF module 20 selects a broadcasting signal having a particular broadcasting frequency band, among the broadcasting signals received through the wireless antenna 1, according to a control signal from the controlling part 50. Specifically, the RF module 20 selects only a broadcasting signal, among a plurality of broadcasting signals having different broadcasting frequencies received through the wireless antenna 1, corresponding to a broadcasting channel to be broadcasted through the broadcasting output part 40, and outputs the selected broadcasting signal to the broadcasting signal processor 30. Such an RF module 20 may be referred to as a tuner for selecting a broadcasting frequency corresponding to a broadcasting channel according to the control signal of the controlling part 50.

The broadcasting output part 40, which is an output functional part to output broadcasting based on a broadcasting signal selected in the RF module 20, may include a display 43 for displaying an image according to the selected broadcasting signal and/or a sound output part 46 for outputting sound according to the selected broadcasting signal.

The broadcasting signal processor 30 is a processing functional part to process the broadcasting signal selected in the RF module 20 so that the broadcasting based on the broadcasting signal can be output through the broadcasting output part 30. In the case where the broadcasting signal processing apparatus according to an exemplary embodiment of the present invention supports digital broadcasting, the broadcasting signal processor 30 may include a channel decoder (not shown) for demodulating an intermediate frequency (IF) broadcasting signal of the broadcasting signal selected in the RF module 20 into a transport stream in a unit of packet, and a demultiplexer (not shown) for separating a sound signal, an image signal and broadcasting information of a broadcasting channel, which is selected by a user from the transport stream output from the channel decoder, into respective bit strings, and outputting the respective bit strings to respective functional parts.

In addition, the broadcasting signal processor 30 may include a sound processor (not shown) for converting the sound signal, which is separated in the demultiplexer, into an analog signal which is then output to the sound output part 46, and an image processor (not shown) for converting the image signal, which is separated in the demultiplexer, into a signal of a format which can be displayed on the display 43, and outputting the signal of the format to the display 43.

The user input part 60 is an information input device by which a user switches and selects a broadcasting channel. The user input part 60 may include a remote controller (not shown) as a key input part for key manipulation by a user, and a signal receiving part (not shown) for receiving a wireless key input signal transmitted from the remote controller, or may be externally connected to the broadcasting signal processing apparatus.

The variable part 10 is provided between the wireless antenna 1 and the RF module 20, i.e., is coupled to the wireless antenna 1 and the RF module 20, for impedance matching between the wireless antenna 1 and the RF module 20. Specifically, under control of the controlling part 50, an impedance of the variable part 10 is adjusted such that characteristic impedance of the wireless antenna 1 is varied. Details of the variable part 10 will be described later with reference to FIGS. 2A to 2D.

The controlling part 50 pre-stores impedance variable values for impedance matching between the wireless antenna 1 and the RF module 20 for broadcasting frequencies corresponding to respective broadcasting channels, and adjusts the impedance of the variable part 10 based on one of the pre-stored impedance variable values for a broadcasting frequency of a selected broadcasting channel.

The controlling part 50 includes an impedance controller 53 and a microcomputer 56.

The microcomputer 56 pre-stores the impedance variable values for the broadcasting frequencies corresponding to the respective broadcasting channels. That is, the microcomputer 56 pre-stores the impedance variable values used to adjust the impedance of the variable part 10 for broadcasting frequency bands corresponding to respective DMB broadcasting channels (for example, CH7, CH8, CH9, CH10, CH11, CH12 and CH13).

As described earlier, as the length of the wireless antenna 1 is determined to meet one broadcasting channel (for example, CH 12), a broadcasting frequency is varied when a broadcasting signal is received through a different broadcasting channel (for example, CH8). Accordingly, an impedance variable value is a control value to adjust the impedance of the variable part 10 in order to compensate for impedance mismatch between the wireless antenna 1 and the RF module 20 due to variation of the broadcasting frequency. In consideration of the determined length of the wireless antenna 1 and impedance of circuit elements included in the variable part 10, it is advantageous but not necessary that the impedance variable value is an experimental value obtainable through an experiment to adjust the impedance of circuit elements included in the variable part 10 in order to adjust a voltage standing wave ratio to be an advantageous small value by matching the impedance between the wireless antenna 1 and the RF module 20 upon receiving a broadcasting frequency corresponding to a broadcasting channel.

In addition, the microcomputer 56 determines whether or not a user switches a broadcasting channel by means of the user input part 60, and controls the RF module 20 and the broadcasting signal processor 30 to tune a selected broadcasting channel and output broadcasting of the tuned broadcasting channel to the broadcasting output part 40. In addition, the microcomputer 56 determines an impedance variable value, which corresponds to a broadcasting frequency of a broadcasting channel selected through the user input part 60, among the pre-stored impedance variable values, and outputs the determined impedance variable value to the impedance controller 53.

Based on the impedance variable value output from the microcomputer 56, the impedance controller 53 adjusts the impedance of the variable part 10 to match the impedance between the wireless antenna 1 and the RF module 20. That is, the microcomputer 56 controls the impedance controller 53 to adjust the impedance of the variable part 10 by outputting the impedance variable value, which corresponds to the broadcasting frequency of the broadcasting channel selected through the user input part 60, to the impedance controller 53.

Although it has been illustrated in FIG. 1 that the broadcasting signal processing apparatus according to an exemplary embodiment of the present invention is a television (TV) with a broadcasting reproduction function, including the broadcasting signal processor 30 and the broadcasting output part 40, this is only by way of example. The broadcasting signal processing apparatus according to an exemplary embodiment of the present invention may be a set-top box for outputting a broadcasting signal to an external broadcasting reproduction apparatus, without the broadcasting signal processor 30 and the broadcasting output part 40. Furthermore, in addition to the TV or the set-top box, the broadcasting signal processing apparatus according to an exemplary embodiment of the present invention may be prepared as various implementations such as mobile terminals or portable computers, which are capable of receiving broadcasting signals, as long as they include the wireless antenna 1.

Now, exemplary embodiments of the variable part 10 will be described with reference to FIGS. 2A to 2D.

Figure 2A:
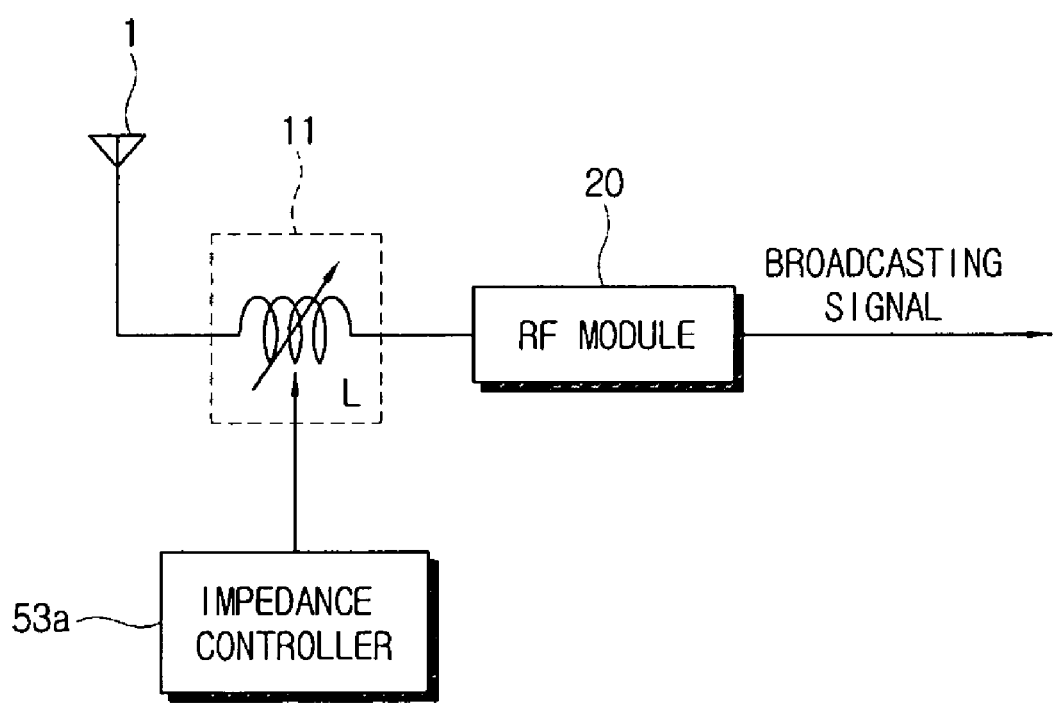
FIGS. 2A to 2D are control block diagrams of a variable part in a broadcasting signal processing apparatus according to various exemplary embodiments of the present invention.

Referring to FIG. 2A, the variable part 10 may include an impedance matching circuit 11 having at least one variable inductor L. The variable inductor L is a circuit element for varying self-inductance or mutual inductance according to the magnitude of a voltage of a control signal applied externally. The impedance matching circuit 11 prepared as the variable part 10 may include one variable inductor L, as shown in FIG. 2A, or a plurality of variable inductors L connected in parallel or in series.

When the variable part 10 is provided as the impedance matching circuit 11 having at least one variable inductor L, an impedance controller 53a corresponding to the impedance controller 53 of FIG. 1 is prepared as shown in FIG. 2A. The impedance controller 53a varies inductance of the variable inductor L included in the impedance matching circuit 11 in order to match the impedance between the wireless antenna 1 and the RF module 20 based on an impedance variable value output from the microcomputer 56.

For example, the impedance between the wireless antenna 1 and the RF module 20 obtainable in the impedance matching circuit 11 as shown in FIG. 2A may be expressed by the following Equation 1.

$$\text{Impedance }(Z)=R+j\omega L \qquad <\text{Equation 1}>$$

Here, R denotes an impedance of the wireless antenna 1, which is proportional to the length of the wireless antenna 1, and $j\omega L$ denotes an impedance of the variable inductor L, which is proportional to an angular frequency $\omega(=2\pi f)$, hence, a frequency f.

With the length of the wireless antenna 1 determined to meet the broadcasting channel CH12 (74 cm), when the broadcasting channel CH12 is switched to the broadcasting channel CH8, as $\omega$ becomes small because the broadcasting frequency of the broadcasting channel CH8 is lower than that of the broadcasting channel CH12, while R is invariable, the impedance Z becomes small, which leads to an impedance mismatching between the wireless antenna 1 and the RF module 20. In this case, the microcomputer 56 determines an impedance variable value corresponding to the broadcasting channel CH8, among the pre-stored impedance variable values, and outputs the determined impedance variable value to the impedance controller 53a. Then, based on the output impedance variable value, the impedance controller 53a outputs a control signal to the variable inductor L of the impedance matching circuit 11. Then, as inductance of the variable inductor L becomes increased by the control signal from the impedance controller 53a, the impedance Z becomes large, which leads to an impedance matching between the wireless antenna 1 and the RF module 20. If the broadcasting channel CH12 is switched to the broadcasting channel CH13, as $\omega$ becomes large because the broadcasting frequency of the broadcasting channel CH13 is higher than that of the broadcasting channel CH12, the impedance Z becomes large, which leads to an impedance mismatching between the wireless antenna 1 and the RF module 20. Then, based on an impedance variable value corresponding to the broadcasting channel CH13, the impedance controller 53a controls the inductance of the variable inductor L of the impedance matching circuit 11 to become decreased, and accordingly, the impedance Z becomes small, which leads to an impedance matching between the wireless antenna 1 and the RF module 20.

In this manner, by outputting an impedance variable value, which corresponds to a broadcasting frequency of a broadcasting channel selected through the user input part 60, to the impedance controller 53a, the microcomputer 56 controls the impedance controller 53a to adjust impedance of the impedance matching circuit 11 prepared as the variable part 10.

Figure 2B:
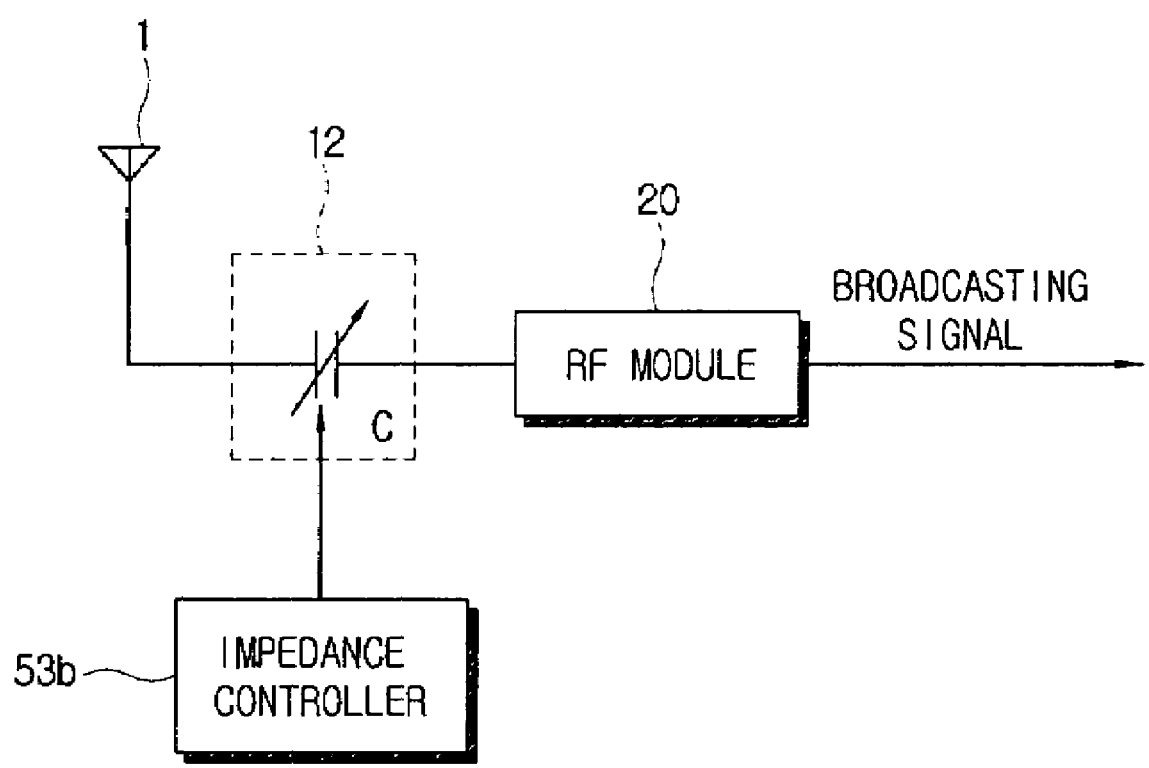

Referring to FIG. 2B, the variable part 10 may include an impedance matching circuit 12 having at least one variable capacitor C. The variable capacitor C is a circuit element for varying its own capacitance according to the magnitude of a voltage of a control signal applied externally. The impedance matching circuit 12 prepared as the variable part 10 may include one variable capacitor C, as shown in FIG. 2B, or a plurality of variable capacitors C connected in parallel or in series.

When the variable part 10 is provided as the impedance matching circuit 12 having at least one variable capacitor C, an impedance controller 53b corresponding to the impedance controller 53 of FIG. 1 is prepared as shown in FIG. 2B. The impedance controller 53b varies capacitance of the variable capacitor C included in the impedance matching circuit 12 in order to match the impedance between the wireless antenna 1 and the RF module 20 based on an impedance variable value output from the microcomputer 56.

For example, the impedance between the wireless antenna 1 and the RF module 20 obtainable in the impedance matching circuit 12 as shown in FIG. 2B may be expressed by the following Equation 2.

$$\text{Impedance }(Z)=R+1/j\omega C \qquad <\text{Equation 2}>$$

Here, R denotes impedance of the wireless antenna 1, which is proportional to the length of the wireless antenna 1, and $1/j\omega C$ denotes an impedance of the variable capacitor C, which is proportional to an angular frequency $\omega(=2\pi f)$, hence, a frequency f.

With the length of the wireless antenna 1 determined to meet the broadcasting channel CH12 (74 cm), when the broadcasting channel CH12 is switched to the broadcasting channel CH8, as ω becomes small because the broadcasting frequency of the broadcasting channel CH8 is lower than that of the broadcasting channel CH12, while R is invariable, the impedance Z becomes large, which leads to an impedance mismatching between the wireless antenna 1 and the RF module 20. In this case, the microcomputer 56 determines an impedance variable value corresponding to the broadcasting channel CH8, among the pre-stored impedance variable values, and outputs the determined impedance variable value to the impedance controller 53b. Then, based on the output impedance variable value, the impedance controller 53b outputs a control signal to the variable capacitor C of the impedance matching circuit 12. Then, as capacitance of the variable capacitor C becomes increased by the control signal from the impedance controller 53b, the impedance Z becomes small, which leads to an impedance matching between the wireless antenna 1 and the RF module 20.

In this manner, by outputting an impedance variable value, which corresponds to a broadcasting frequency of a broadcasting channel selected through the user input part 60, to the impedance controller 53b, the microcomputer 56 controls the impedance controller 53b to adjust impedance of the impedance matching circuit 12 prepared as the variable part 10.

Figure 2C:
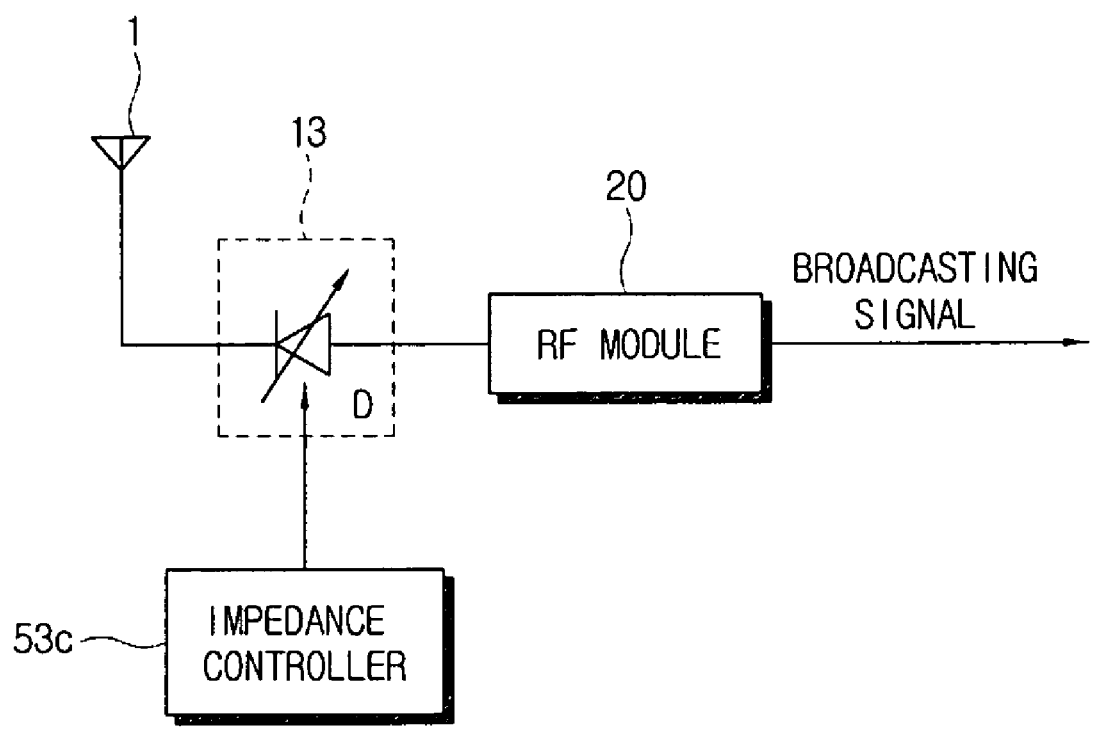

Referring to FIG. 2C, the variable part 10 may include an impedance matching circuit 13 having at least one variable capacitance diode (also called 'varactor') C. The variable capacitance diode D is a circuit element for varying its own capacitance according to the magnitude of a voltage of a control signal applied externally. The impedance matching circuit 13 prepared as the variable part 10 may include one variable capacitance diode D, as shown in FIG. 2C, or a plurality of variable capacitance diodes D connected in parallel or in series.

When the variable part 10 is provided as the impedance matching circuit 13 having at least one variable capacitance diode D, an impedance controller 53c corresponding to the impedance controller 53 of FIG. 1 is prepared as shown in FIG. 2C. The impedance controller 53c varies capacitance of the variable capacitance diode D included in the impedance matching circuit 13 in order to match the impedance between the wireless antenna 1 and the RF module 20 based on an impedance variable value output from the microcomputer 56.

For example, the impedance between the wireless antenna 1 and the RF module 20 obtainable in the impedance matching circuit 13 as shown in FIG. 2C may be expressed by the following Equation 3.

$$\text{Impedance }(Z)=R+1/j\omega C \qquad <\text{Equation 3}>$$

Here, R denotes impedance of the wireless antenna 1, which is proportional to the length of the wireless antenna 1, and $1/j\omega C$ denotes impedance of the variable capacitance diode D, which is proportional to an angular frequency $\omega(=2\pi f)$, hence, a frequency f.

With the length of the wireless antenna 1 determined to meet the broadcasting channel CH12 (74 cm), when the broadcasting channel CH12 is switched to the broadcasting channel CH8, as ω becomes small because the broadcasting frequency of the broadcasting channel CH8 is lower than that of the broadcasting channel CH12, while R is invariable, the impedance Z becomes large, which leads to an impedance mismatching between the wireless antenna 1 and the RF module 20. In this case, the microcomputer 56 determines an impedance variable value corresponding to the broadcasting channel CH8, among the pre-stored impedance variable values, and outputs the determined impedance variable value to the impedance controller 53c. Then, based on the output impedance variable value, the impedance controller 53c outputs a control signal to the variable capacitance diode D of the impedance matching circuit 13. Then, as capacitance C of the variable capacitance diode D becomes increased by the control signal from the impedance controller 53c, the impedance Z becomes small, which leads to an impedance matching between the wireless antenna 1 and the RF module 20.

In this manner, by outputting an impedance variable value, which corresponds to a broadcasting frequency of a broadcasting channel selected through the user input part 60, to the impedance controller 53c, the microcomputer 56 controls the impedance controller 53c to adjust impedance of the impedance matching circuit 13 prepared as the variable part 10.

Figure 2D:
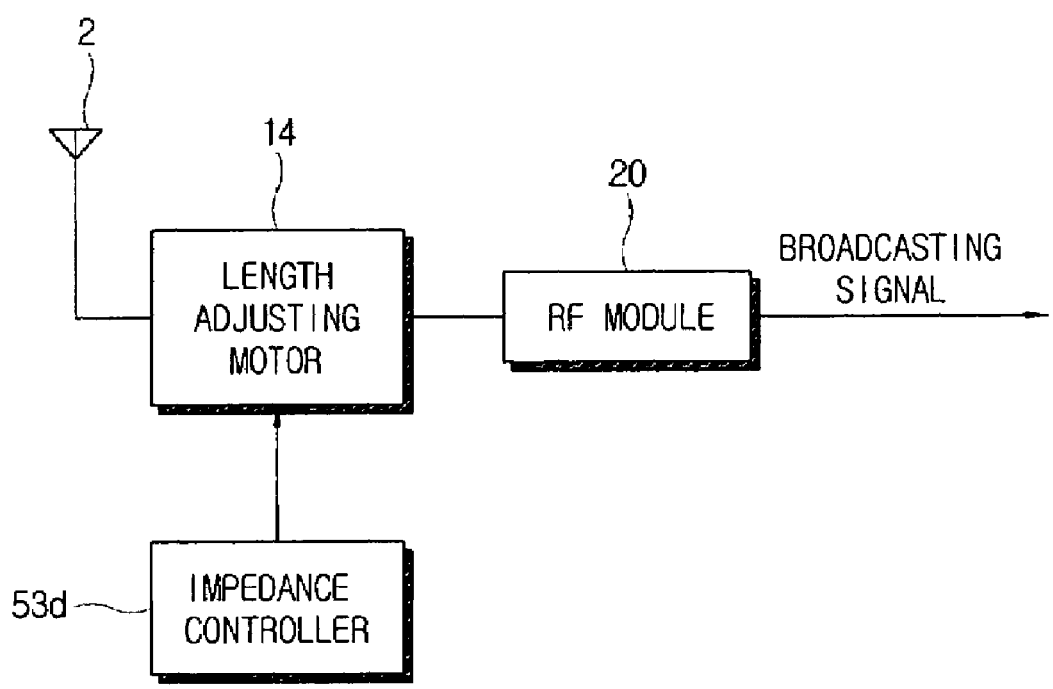

Referring to FIG. 2D, the variable part 10 may include a length adjusting motor 14 for adjusting the length of a wireless antenna 2. The wireless antenna 2 has a structure where the length of the wireless antenna 2 is prolonged or shortened by actuation of the length adjusting motor 14. The length adjusting motor 14 is a driver for prolonging or shortening the length of the wireless antenna 2 according to a control signal applied externally and may have a configuration similar to or the same configuration as that of a general motor if only it can adjust the length of the wireless antenna 2.

When the variable part 10 is provided as the length adjusting motor 14, an impedance controller 53d corresponding to the impedance controller 53 of FIG. 1 is prepared as shown in FIG. 2D. The impedance controller 53d controls the length adjusting motor 14 to match the impedance between the wireless antenna 2 and the RF module 20 based on an impedance variable value output from the microcomputer 56.

For example, with the length adjusting motor 14 as shown in FIG. 2D, when a broadcasting channel is switched to the broadcasting channel CH8, the microcomputer 56 determines an impedance variable value corresponding to the broadcasting channel CH8, among the pre-stored impedance variable values, and outputs the determined impedance variable value to the impedance controller 53d. Then, based on the output impedance variable value, the impedance controller 53d outputs a control signal to the length adjusting motor 14. Then, the length adjusting motor 14 may match the impedance Z to meet the broadcasting channel CH8 by prolonging the length of the wireless antenna 1 by the control signal from the impedance controller 53d.

In this manner, by outputting an impedance variable value, which corresponds to a broadcasting frequency of a broadcasting channel selected through the user input part 60, to the impedance controller 53d, the microcomputer 56 controls the impedance controller 53d to adjust the length of the wireless antenna 1 by controlling the length adjusting motor 14 prepared as the variable part 10.

Although it has been illustrated in FIGS. 2A to 2C that the impedance matching circuit 11, 12 and 13 includes one of the circuit elements, that is, the variable inductor L, the variable capacitor C and the variable capacitance diode D, this is only by way of example. The variable part 10 may comprise an impedance matching circuit including two or more of, or all of, the variable inductor L, the variable capacitor C and the variable capacitance diode D. That is, the variable part 10 may comprise an impedance matching circuit including a variable inductor L and a variable capacitor C, or including a variable inductor L, a variable capacitor C, and a variable capacitance diode D.

When the variable part 10 comprises an impedance matching circuit including two or more of, or all of, the variable inductor L, the variable capacitor C and the variable capacitance diode D, the impedance controller 53 may vary at least one of the variable inductor L, the variable capacitor C and the variable capacitance diode D, which are included in the impedance matching circuit, to match the impedance between the wireless antenna 1 and the RF module 20 based on an impedance variable value output from the microcomputer 56.

In addition, since structures prepared as the variable parts 10 shown in FIGS. 2A to 2D are different from each other, the impedance variable values mentioned in the exemplary embodiments described with reference to FIGS. 2A to 2D will be also different data.

For example, the exemplary embodiment shown in FIG. 2A employs the variable inductor L as the variable part 10. Accordingly, when a broadcasting signal having a broadcasting frequency corresponding to a broadcasting channel is received, the impedance variable value in the exemplary embodiment shown in FIG. 2A may be an experimental value obtainable through an experiment to adjust the impedance of the variable part 10 including the variable inductor L in order to adjust a voltage standing wave ratio to be a desirable small value by matching the impedance between the wireless antenna 1 and the RF module 20.

In addition, the exemplary embodiment shown in FIG. 2B employs the variable capacitor C as the variable part 10. Accordingly, when a broadcasting signal having a broadcasting frequency corresponding to a broadcasting channel is received, the impedance variable value in the exemplary embodiment shown in FIG. 2B may be an experimental value obtainable through an experiment to adjust the impedance of the variable part 10 including the variable capacitor C in order to adjust a voltage standing wave ratio to be a desirable small value by matching the impedance between the wireless antenna 1 and the RF module 20.

As described above, by adjusting the impedance of the variable part 10 based on an impedance variable value corresponding to a broadcasting frequency of a broadcasting channel selected through the user input part 60, the broadcasting signal processing apparatus of an exemplary embodiment of the present invention overcomes a problem of an impedance mismatching between the wireless antenna 1 and the RF module 20, which may occur in switching broadcasting channels, thus allowing an impedance matching between the wireless antenna 1 and the RF module 20. Accordingly, the broadcasting signal processing apparatus according to an exemplary embodiment of the present invention may overcome related art problems of a difference in receive capability between broadcasting channels, which may occur due to the invariability of length of the wireless antenna to meet a particular broadcasting channel.

Figure 3:
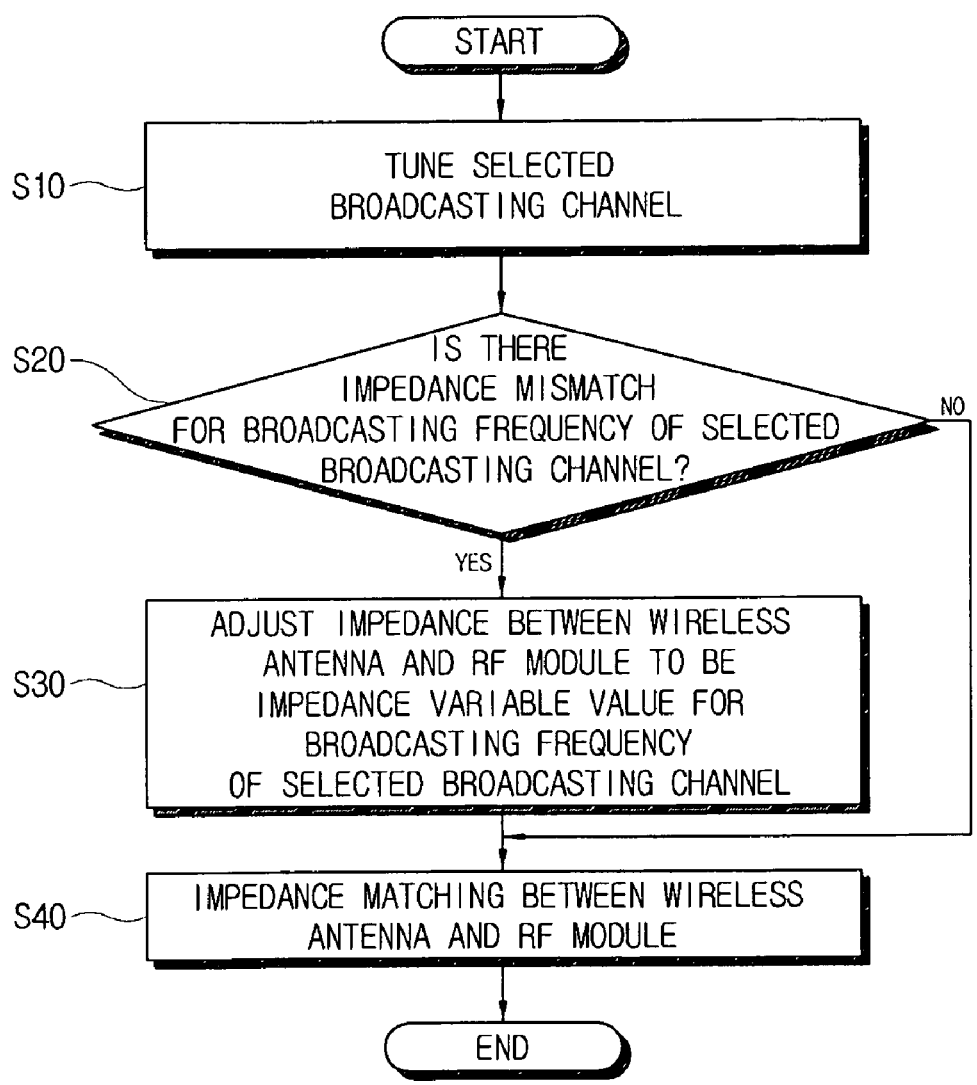
FIG. 3 is a control flowchart illustrating an operation of the broadcasting signal processing apparatus according to an exemplary embodiment of the present invention.

A control method according to an exemplary embodiment of the present invention will now be described with reference to FIG. 3.

Prior to the description about the control method, it is assumed that the broadcasting signal processing apparatus has a structure where the variable part 10 to match impedance between the wireless antenna 1 and the RF module for tuning a broadcasting signal received through the wireless antenna 1 is coupled to the wireless antenna 1 and the RF module 20, as shown in FIG. 1.

The microcomputer 56 controls the RF module 20 to tune to a broadcasting channel (S10). The broadcasting channel may be selected by a user through the user input part 60. Then, the microcomputer 56 controls the broadcasting signal processor 30 to output a broadcasting signal of the tuned broadcasting channel to the broadcasting output part 40. At this time, the microcomputer 56 determines whether there is an impedance difference, i.e., mismatch, between an impedance of the wireless antenna 1 and an impedance of the RF module 20 for the broadcasting frequency of the tuned broadcasting channel at operation S20. Operation S20 may be performed when the microcomputer 56 determines whether the impedance between the antenna 1 and the RF module 20 is different from any of impedance variable values used to match the impedance between the antenna 1 and the RF module 20 for the broadcasting frequency of the tuned broadcasting channel. It is advantageous but not necessary that the microcomputer 56 pre-stores the impedance variable values used for the impedance matching between the antenna 1 and the RF module 20 for broadcasting frequencies of broadcasting channels.

If it is determined at operation S20 that there is an impedance mismatch because the impedance used to match the impedance of the antenna 1 with the impedance of the RF module 20 is different from any of the pre-stored impedance variable values corresponding to the broadcasting frequencies of the broadcasting channels, the microcomputer 56 adjusts the impedance between the wireless antenna 1 and the RF module 20 to be equal to an impedance variable value corresponding to the broadcasting frequency of the tuned broadcasting channel at operation S30. Accordingly, the impedance between the wireless antenna 1 and the RF module 20 is matched in receiving the broadcasting signal of the tuned broadcasting channel at operation S40.

Adjusting the impedance between the wireless antenna 1 and the RF module 20 to be equal to the impedance variable value corresponding to the broadcasting frequency of the tuned broadcasting channel at operation S30 may be achieved when the microcomputer 56 varies at least one of inductance of the variable inductor, capacitance of the variable capacitor, and capacitance of the variable capacitance diode between the wireless antenna 1 and the RF module 20 to adjust the impedance between the wireless antenna 1 and the RF module 20 to be equal to the impedance variable value corresponding to the broadcasting frequency of the tuned broadcasting channel. In addition, adjusting the impedance of the variable part 10 between the wireless antenna 1 and the RF module 20 to be equal to the impedance variable value corresponding to the broadcasting frequency of the tuned broadcasting channel at operation S30 may be achieved when the microcomputer 56 controls the length adjusting motor to adjust the length of the wireless antenna 1 to thereby adjust the impedance between the wireless antenna 1 and the RF module 20 to be equal to the impedance variable value corresponding to the broadcasting frequency of the tuned broadcasting channel.

Figure 4:
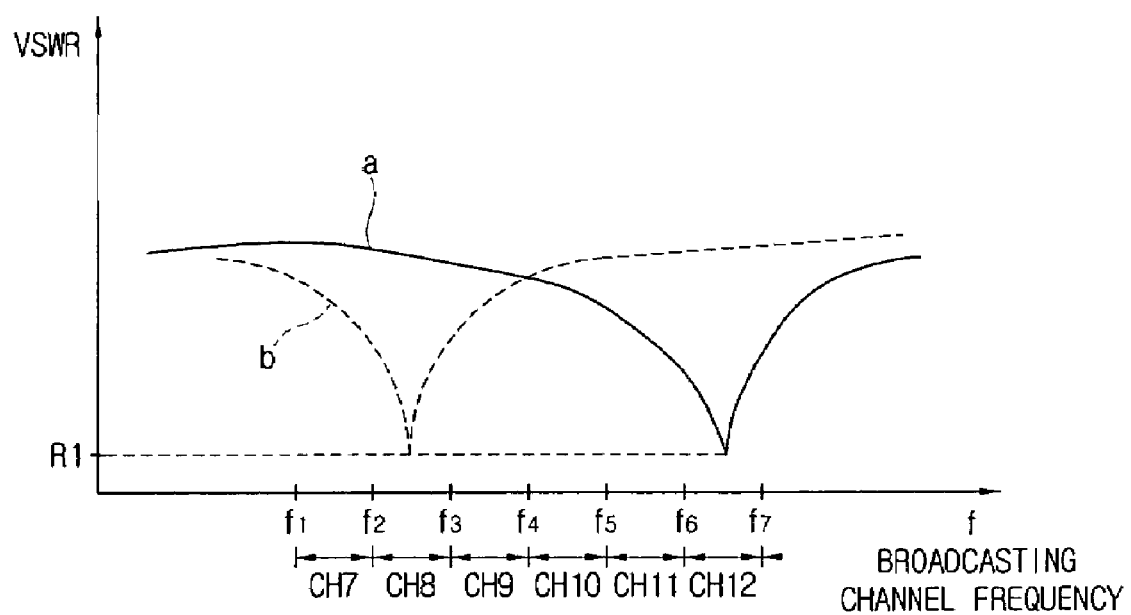
FIG. 4 is a diagram showing a voltage standing wave ratio (VSWR) in the broadcasting signal processing apparatus according to an exemplary embodiment of the present invention.
Figure 5:
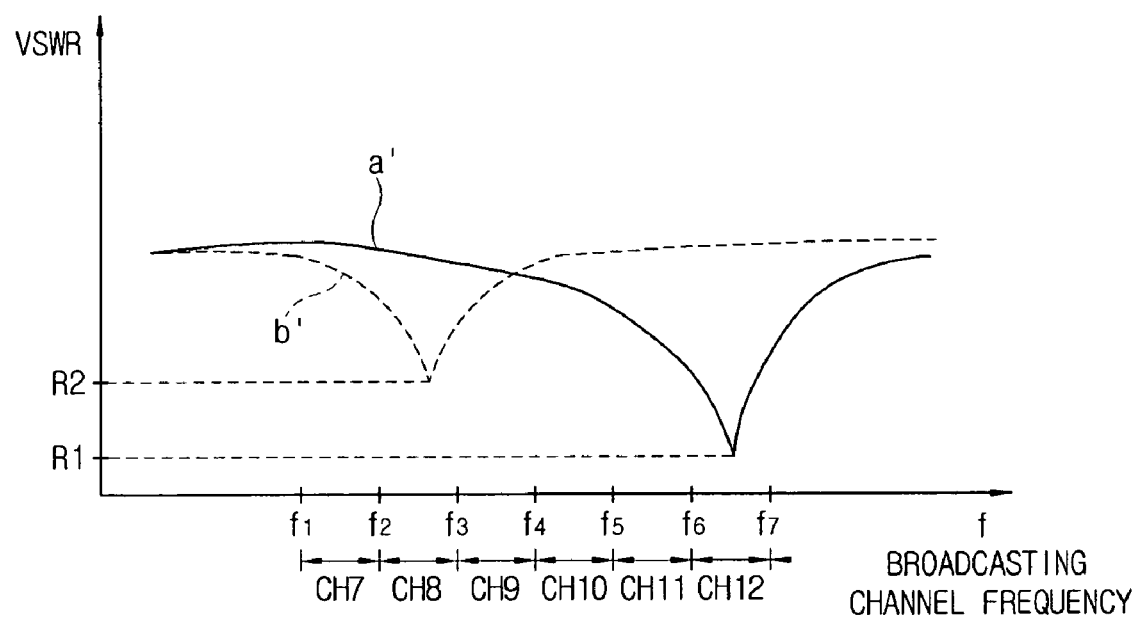
FIG. 5 is a diagram showing a VSWR in a related art broadcasting signal processing apparatus.

With the above-configured broadcasting signal processing apparatus according to an exemplary embodiment of the present invention and the control method thereof, a difference in receipt capability between broadcasting channels will be now described with reference to a graphical diagram of FIG. 4 showing a voltage standing wave ratio (VSWR).

FIG. 4 shows a VSWR a in selecting the broadcasting channel CH12 and a VSWR b in selecting the broadcasting channel CH8 in the broadcasting signal processing apparatus in which the length of the wireless antenna 1 is determined to meet the broadcasting channel CH12. As can be seen in FIG. 4, since the length of the wireless antenna 1 is determined to meet the broadcasting channel CH12, when the wireless antenna 1 receives a broadcasting signal having a broadcasting frequency band (f6~f7) corresponding to the broadcasting channel CH12, the VSWR a of the wireless antenna 1 has a desirable very small value R1 due to the impedance matching between the wireless antenna 1 and the RF module 20. In addition, when the wireless antenna 1 receives a broadcasting signal having a different broadcasting frequency band (f2~f3) corresponding to the broadcasting channel CH8, the impedance of the variable part 10 is adjusted based on the impedance variable value corresponding to the broadcasting channel CH8, and accordingly, the VSWR b of the wireless antenna 1 has a desirable very small value R1 due to the impedance matching between the wireless antenna 1 and the RF module 20.

As mentioned above with reference to FIG. 4, by adjusting the impedance of the variable part 10 based on an impedance variable value corresponding to a broadcasting frequency of a broadcasting channel selected through the user input part 60, the broadcasting signal processing apparatus according to an exemplary embodiment of the present invention and the control method hereof address a problem of an impedance mismatch between the wireless antenna 1 and the RF module 20, which may occur in switching broadcasting channels, thus allowing an impedance matching between the wireless antenna 1 and the RF module 20. Accordingly, the broadcasting signal processing apparatus according to an exemplary embodiment of the present invention and the control method thereof may address problems in the related art of a difference in receipt capability between broadcasting channels, which may occur due to the invariability of length of the wireless antenna to meet a particular broadcasting channel, and hence instability of broadcasting conditions.

As apparent from the above description, exemplary embodiments of the present invention provide a broadcasting signal processing apparatus, which is capable of reducing a difference in receive sensitivity between channels, which occurs in changing a broadcasting channel, when a broadcasting signal is received through a wireless antenna, and a control method thereof.

Although a few exemplary embodiments of the present inventive concept have been shown and described, it will be appreciated by those skilled in the art that changes may be made in these exemplary embodiments without departing from the principles and spirit of the invention, the scope of which is defined in the appended claims and their equivalents.

What is claimed is:

1. A broadcasting signal processing apparatus comprising:
a wireless antenna which receives broadcasting signals;
a radio frequency (RF) module which tunes a broadcasting signal received via the wireless antenna;
a variable part which adjusts an impedance to match an impedance of the wireless antenna with an impedance of the RF module, the variable part being coupled to the wireless antenna and the RF module;
a controlling part which pre-stores impedance variable values for impedance matching between the wireless antenna and the RF module for broadcasting frequencies corresponding to respective broadcasting channels, and which controls the variable part to adjust the impedance based on one of the pre-stored impedance variable values corresponding to a broadcasting frequency of a selected broadcasting channel;
a broadcasting output part; and
a broadcasting signal processor which processes the broadcasting signal tuned in the RF module and outputs the tuned broadcasting signal to the broadcasting output part;
wherein the wireless antenna has a determined length to meet a broadcasting frequency corresponding to one of a plurality of broadcasting channels,
wherein the broadcasting output part comprises at least one of a display which displays a broadcasting picture according to the tuned broadcasting signal and a sound output part which outputs a broadcasting sound according to the tuned broadcasting signal.

2. The broadcasting signal processing apparatus according to claim 1, further comprising a user input part which selects a broadcasting channel,
wherein the controlling part further comprises:
a microcomputer which pre-stores the impedance variable values for the broadcasting frequencies corresponding to the broadcasting channels and outputs an impedance variable value, among the pre-stored impedance variable values, corresponding to a broadcasting frequency of a broadcasting channel selected through the user input part; and
an impedance controller which controls the variable part to adjust the impedance to match the impedance of the wireless antenna with the impedance of the RF module based on the pre-stored impedance variable value.

3. The broadcasting signal processing apparatus according to claim 2, wherein the variable part comprises an impedance matching circuit including at least one variable inductor,
wherein an inductance value of the variable inductor is varied based on the pre-stored impedance variable value.

4. The broadcasting signal processing apparatus according to claim 3, wherein the impedance controller varies an inductance value of the at least one variable inductor to adjust the impedance to match the impedance of the wireless antenna with the impedance of the RF module based on the impedance variable value when one of broadcasting channels other than the broadcasting channel which has been used to meet the length of the wireless antenna is selected.

5. The broadcasting signal processing apparatus according to claim 2, wherein the variable part comprises an impedance matching circuit including at least one variable capacitor,
wherein a capacitance value of the variable capacitor is varied based on the pre-stored impedance variable value.

6. The broadcasting signal processing apparatus according to claim 5, wherein the impedance controller varies a capacitance of the at least one variable capacitor to adjust the impedance to match the impedance of the wireless antenna with the impedance of the RF module when one of broadcasting channels other than the broadcasting channel which has been used to meet the length of the wireless antenna is selected.

7. The broadcasting signal processing apparatus according to claim 2, wherein the variable part comprises an impedance matching circuit including at least one variable capacitance diode,
 wherein a capacitance value of the variable capacitance diode is varied based on the pre-stored impedance variable value.

8. The broadcasting signal processing apparatus according to claim 7, wherein the impedance controller varies a capacitance of the at least one variable capacitance diode to adjust the impedance to match the impedance of the wireless antenna and the impedance of the RF module when one of broadcasting channels other than the broadcasting channel which has been used to meet the length of the wireless antenna is selected.

9. The broadcasting signal processing apparatus according to claim 2, wherein the variable part comprises an impedance matching circuit including at least two of a variable inductor, a variable capacitor and a variable capacitance diode.

10. The broadcasting signal processing apparatus according to claim 9, wherein the impedance controller varies each of the at least two of the inductance of the variable inductor, the capacitance of the variable capacitor, and the capacitance of the variable capacitance diode to adjust the impedance to match the impedance of the wireless antenna with the impedance of the RF module when one of broadcasting channels other than the broadcasting channel which has been used to meet the length of the wireless antenna is selected.

11. The broadcasting signal processing apparatus according to claim 2, wherein the variable part comprises a length adjusting motor which adjusts a length of the wireless antenna,
 wherein the length of the wireless antenna is adjusted by the length adjusting motor based on the pre-stored impedance variable value.

12. The broadcasting signal processing apparatus according to claim 11, wherein the impedance controller controls the length adjusting motor to adjust the length of the wireless antenna to match the impedance between the wireless antenna and the RF module when one of broadcasting channels other than the broadcasting channel which has been used to meet the length of the wireless antenna is selected.

13. A broadcasting signal processing method comprising:
 tuning to a broadcasting frequency of a broadcasting channel;
 determining whether an impedance used to match an impedance of a wireless antenna with an impedance of a radio frequency (RF) module is different from an impedance variable value for the tuned broadcasting frequency of the broadcasting channel;
 if the impedance is different from the impedance variable value, adjusting the impedance based on the impedance variable value for the tuned broadcasting frequency of the selected broadcasting channel; and
 at least one of displaying a broadcasting picture according to the tuned broadcasting signal and outputting a broadcasting sound according to the tuned broadcasting signal,
 wherein the wireless antenna has a determined length to meet a broadcasting frequency corresponding to one of a plurality of broadcasting channels.

14. A broadcasting signal processing method according to claim 13, further comprising selecting a broadcast channel.

15. A broadcasting signal processing method according to claim 13, wherein the adjusting the impedance comprises adjusting the impedance to the impedance variable value for the tuned broadcasting frequency of the selected broadcasting channel,
 wherein the selected broadcasting channel is one of broadcasting channels other than the broadcasting channel which has been used to meet the length of the wireless antenna.

16. A broadcasting signal processing method according to claim 15, wherein the adjusting the impedance to the impedance variable value comprises varying at least one of an inductance of a variable inductor, a capacitance of a variable capacitor, and a capacitance of a variable capacitance diode, which are coupled to the wireless antenna and the RF module, to adjust the impedance to the impedance variable value for the tuned broadcasting frequency of the selected broadcasting channel.

17. A broadcasting signal processing method according to claim 15, wherein the adjusting the impedance to the impedance variable value comprises controlling a length adjusting motor to adjust a length of the wireless antenna to adjust the impedance between the wireless antenna and the RF module to the impedance variable value for the tuned broadcasting frequency of the selected broadcasting channel.

* * * * *